United States Patent Office 3,359,430
Patented Dec. 19, 1967

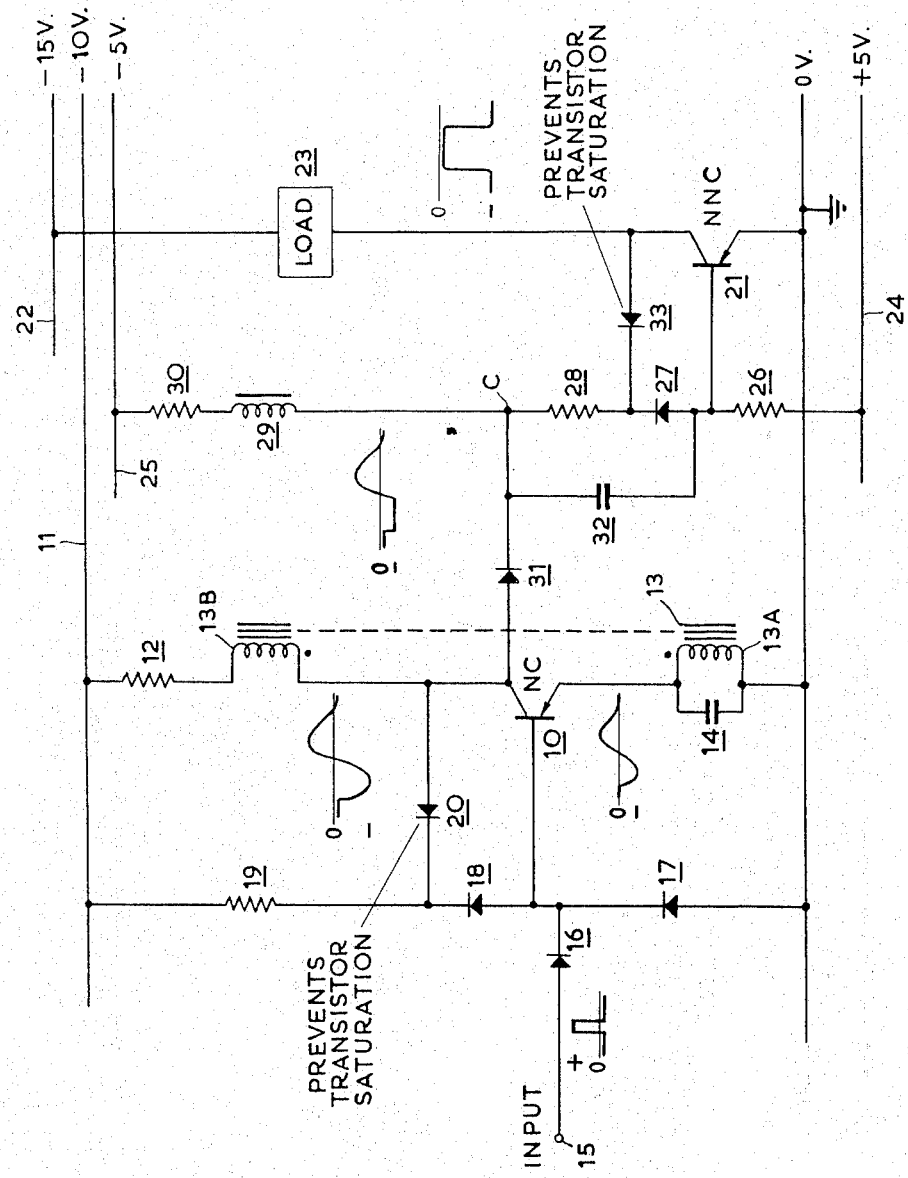

3,359,430
PULSE GENERATOR EMPLOYING RESONANT LC NETWORK IN BASE-EMITTER CIRCUIT OF TRANSISTOR
Wilfred James Jones, Edinburgh, Scotland, assignor to The English Electric Company Limited, London, England, a British company
Filed Apr. 15, 1964, Ser. No. 359,907
Claims priority, application Great Britain, Apr. 23, 1963, 15,960/63
3 Claims. (Cl. 307—88.5)

The invention relates to electric pulse generator circuits.

According to the invention, an electric pulse generator circuit for producing an electrical pulse of predetermined duration comprises a first transistor for energization from a unidirectional voltage source, an inductance-capacitance timing circuit in the base-emitter circuit of the transistor, means for momentarily changing the base-emitter potential of the transistor to alter the current in the collector circuit thereof to a new value, means inductively coupling the inductance-capacitance timing circuit with the collector circuit whereby alteration of the collector circuit current in response to a said momentary change of base-emitter potential causes the collector circuit current to be held at the new value for a length of time dependent on the values of the elements in the inductance-capacitance timing circuit, and output means operative in response to the alteration of the collector current to the new value for producing the said pulse, the pulse existing for the said length of time that the collector circuit current remains at the new value.

Preferably, the pulse generator circuit includes a load circuit in which the said pulse in the form of an electric current is to be produced, and a second transistor for controlling the current through the load circuit, the said output means comprising means for controlling the base-emitter potential of the second transistor in dependence upon the collector current of the first transistor.

Advantageously, the first transistor is normally conducting in a nearly saturated condition and the said momentary alteration of its base-emitter potential renders it non-conducting.

According to a feature of the invention, the output means comprises a chain of impedance elements for connection between the poles of the unidirectional source, the base of the second transistor being connected to a point in the chain for determining the base-emitter potential of the second transistor, and means interconnecting the collector of the first transistor with the chain so that at least part of the collector circuit current of the first transistor passes through part of the chain, the said alteration in the collector circuit current of the first transistor thus varying the base-emitter potential of the second transistor. The part of the chain through which part of the collector circuit current of the first transistor flows may include an inductive element, so that alteration of the collector circuit current causes a magnified potential change across the inductive element, and a capacitor interconnecting the inductive element and the base of the second transistor for transferring to the base the said magnified potential charge.

An electric pulse generator circuit for passing a current pulse of predetermined duration and magnitude through a load circuit, and incorporating the invention, will now be described by way of example with reference to the accompanying drawing which shows the circuit schematically. The voltage waveforms at various points in the circuit are shown on the drawing, with the ground voltage (0) indicated and with positive voltages upwards.

Referring to the drawing, a first transistor 10 has its emitter-collector circuit connected between earth and a —10 v. busbar 11 through a resistor 12 and windings 13A, 13B of a transformer 13, the primary winding 13A being connected to the emitter and electrically in parallel with a capacitor 14, and the secondary winding 13B to the collector. The base of the transistor 10 is connected to a signal input terminal 15 through a diode 16, and to earth through a diode 17; it is also connected to the busbar 11 through a diode 18 and a resistor 19, both connected in series. A diode 20 is connected between the collector of the transistor 10 and the junction of the resistor 19 and the diode 18.

A second transistor 21 has its emitter connected to earth and its collector connected to a —15 v. busbar 22 through the load circuit 23 through which the current pulses are to be passed. A chain of impedances between a +5 v. busbar 24 and a —5 v. busbar 25 comprises a resistor 26, a diode 27, a resistor 28, an inductance 29 and a resistor 30 in that order from positive to negative. The collector of the first transistor 10 is connected through a diode 31 to the junction at point C of the resistor 28 with the inductor 29. The base of the second transistor is connected to the junction of the resistor 26 with the diode 27 and through a capacitor 32 to point C. A diode 33 is connected between the collector of the transistor 21 and the junction of the resistor 28 with the diode 27.

The operation of the circuit will now be described. In the quiescent state, current flowing through resistor 19 from the base-emitter circuit of transistor 10 holds the transistor conducting in a nearly saturated condition, the base-emitter potential of the transistor 10 not being sufficient to cause diode 17 to conduct. The collector potential is prevented by the diode 20 from rising so close to the base potential as to cause the transistor to saturate: the maximum collector potential is about —0.6 v. Thus the point C is maintained at this voltage while the transistor 10 is conducting. The relative values of the resistors 26, 28 and 30 are such that a proportion of the current in the resistor 30 is part of the collector circuit current from the transistor 10 and passes through the diode 31 and the inductor 29. The relative values are also such that the base of the transistor 21 is held positive so that the transistor 21 is not conducting.

When a positive going pulse is applied to terminal 15 the transistor 10 stops conducting and the consequent alteration of the current in the collector circuit causes the current in the primary winding 13A of the transformer 13 to be reversed. The capacitor 14 therefore charges so that the emitter potential of transistor 10 becomes negative with respect to its base potential and transistor 10 remains non-conducting for a period determined by the capacitance of the capacitor 14 and the inductance of the primary winding 13A. At the start of this period, the collector current falls to zero and the current flow from transistor 10 to the resistor 30 ceases. The back E.M.F. across the inductor 29, which is set up by the cessation of current flow from transistor 10, lowers the potential of the point C. This potential change has two effects: firstly, it is transferred through the capacitor 32 to the base of the transistor 21, which starts to conduct; secondly, the current flow through the resistor 26, diode 27 and the resistor 28 is increased so that the voltage drop across the resistor 26 is increased, thus maintaining the transistor 21 conducting. The diode 33 prevents the transistor 21 from saturating. When capacitor 14 has completely discharged, at the end of the timing period, transistor 10 starts to conduct again. Its collector potential rises and this rise is transferred through diode 31 and capacitor 32 to the base of the transistor 21 which becomes non-conducting. The potential of the point C rises near to the collector potential of the transistor 10, and the quiescent state is re-attained. Current from the collector of transistor 10 divides between the path including resistor 12 and the path including resistors 26, 28 and 30, and these resistors provide sufficient damping to prevent oscillation.

For the duration of the timing period, the length of which is determined by the values of the capacitor 14 and the primary winding 13A, the transistor 21 is conducting and permits a current flow of predetermined magnitude to flow in the load circuit 23 for the duration of the timing period. The diode 17 prevents the base of transistor 10 from moving negatively during the time transistor 10 is not conducting.

What I claim as my invention and desire to secure by Letters Patent is:

1. An electrical one-shot circuit having an active and a quiescent state, comprising;
    a transistor having emitter, base, and collector electrodes;
    a collector circuit connected to the collector electrode and including a first inductor and at least one resistor connected in series to a source of biasing potential; and
    an emitter-base circuit connected between the emitter and base electrodes and including
        means for biasing the transistor into conduction in the quiescent state,
        means for receiving input pulses effective to turn the transistor off and thereby cause the active state to commence, and
        a resonant circuit comprising a capacitor and a second inductor connected in parallel:
    the first and second inductors being inductively coupled together for causing a reversal of current in the second inductor in response to a change of current in the first inductor occurring in consequence of an input pulse.

2. An electrical one-shot circuit according to claim 1, in which the resonant circuit is connected to the emitter electrode of the transistor.

3. An electrical one-shot circuit according to claim 1, and further comprising a transistorized inverter, and a diode connected between the collector electrode of the transistor and the inverter and so poled as to become nonconductive during the active state of the circuit.

References Cited

UNITED STATES PATENTS

| 2,952,784 | 9/1960 | Carr | 307—88.5 |
| 3,002,110 | 9/1961 | Hamilton | 307—88.5 |
| 3,040,185 | 6/1962 | Horton | 307—88.5 |
| 3,050,639 | 8/1962 | Tate | 307—88.5 |
| 3,229,151 | 1/1966 | Attwood | 307—88.5 |

ARTHUR GAUSS, *Primary Examiner.*

J. S. HEYMAN, D. J. GALVIN, *Assistant Examiners.*